(12) United States Patent
Abraham et al.

(10) Patent No.: US 8,331,654 B2
(45) Date of Patent: Dec. 11, 2012

(54) STEREO-IMAGE REGISTRATION AND CHANGE DETECTION SYSTEM AND METHOD

(75) Inventors: Michael Abraham, Rishon Le Zion (IL); Victor Gostynski, Ashdod (IL)

(73) Assignee: Elta Systems Ltd., Ashdod (IL)

( * ) Notice: Subject to any disclaimer, the term of this patent is extended or adjusted under 35 U.S.C. 154(b) by 265 days.

(21) Appl. No.: 12/739,592

(22) PCT Filed: Oct. 23, 2008

(86) PCT No.: PCT/IL2008/001396
§ 371 (c)(1),
(2), (4) Date: Apr. 23, 2010

(87) PCT Pub. No.: WO2009/053977
PCT Pub. Date: Apr. 30, 2009

(65) Prior Publication Data
US 2010/0303340 A1 Dec. 2, 2010

(30) Foreign Application Priority Data

Oct. 23, 2007 (IL) .......................................... 186856
May 21, 2008 (IL) .......................................... 191615

(51) Int. Cl.
*G06K 9/00* (2006.01)
(52) U.S. Cl. ..................................................... 382/154
(58) Field of Classification Search .................. 382/151, 382/154, 209, 216, 218, 225, 294; 348/42, 348/47–50; 345/419–420
See application file for complete search history.

(56) References Cited

U.S. PATENT DOCUMENTS

| 4,975,704 | A | | 12/1990 | Gabriel et al. |
| 5,530,774 | A | | 6/1996 | Fogel |
| 6,061,083 | A | * | 5/2000 | Aritake et al. .................. 348/51 |
| 6,862,364 | B1 | * | 3/2005 | Berestov ....................... 382/132 |
| 8,064,687 | B2 | * | 11/2011 | Rouge et al. .................. 382/154 |
| 2006/0239537 | A1 | | 10/2006 | Shragai et al. |

FOREIGN PATENT DOCUMENTS

WO    WO 2006/064261 A1    6/2006

OTHER PUBLICATIONS

International Search Report issued on Mar. 2, 2009 in International Application No. PCT/IL2008/001396.

(Continued)

*Primary Examiner* — Daniel Mariam
(74) *Attorney, Agent, or Firm* — Oliff & Berridge, PLC

(57) ABSTRACT

A system and method for registering stereoscopic images comprising: obtaining at least two sets of stereoscopic images, each one of the at least two sets including at least two images that are taken from different angles, determining at least two groups of images, each one of the groups including at least two images that are respective images of at least two of the sets or are derived therefrom. For each one of the groups, calculating a respective optimal entities list and stereo-matching at least two images, each one being or derived from different one of the at least two groups and same or different sets, using at least four optimal entities from each one of the optimal entities list, thereby giving rise to at least one pair of registered stereoscopic images.

20 Claims, 11 Drawing Sheets

OTHER PUBLICATIONS

Written Opinion of the International Searching Authority issued on Mar. 2, 2009 in International Application No. PCT/IL2008/001396.

Y. Ohta et al., "Stereo by Intra- and Inter-Scanline Search Using Dynamic Programming," *IEEE Transactions on Pattern Analysis and Machine Intelligence*, vol. PAMI-7, No. 2, pp. 139-154, Mar. 1985.

I. J. Cox et al., "Dynamic Histogram Warping of Image Pairs for Constant Image Brightness", *IEEE Int. Conf. on Image Processing*, vol. 1, No. 2, pp. 366-369; 1995.

D. Scharstein et al., "A Taxonomy and Evaluation of Dense Two-Frame Stereo Correspondence Algorithms," *International Journal of Computer Vision*, vol. 47, Issue 1-3, pp. 7-42, Apr.-Jun. 2002.

I. J. Cox et al., "A Maximum Likelihood Stereo Algorithm," *Computer Vision and Image Understanding*, vol. 63, No. 3, pp. 542-567, May 1996.

D. Geiger et al., "Occlusions and Binocular Stereo," ECCV, pp. 425-433, Aug. 12, 1994.

T. Krauβ et al., "DEM Generation from Very High Resolution Stereo Satellite Data in Urban Areas," 2005.

S. Birchfield et al. "Depth Discontinues by Pixel-to-Pixel Stereo," *IEEE International Conference on Computer Vision*, pp. 1073-1080, 1998.

\* cited by examiner

STEREO-IMAGE REGISTRATION AND CHANGE DETECTION SYSTEM AND METHOD

FIELD OF THE INVENTION

The present invention relates generally to remote sensing imagery systems and more particularly to sensing imagery systems which utilize multiple images of a scene.

BACKGROUND OF THE INVENTION

Remote sensing imagery is used in diverse fields such as urban planning, military, intelligence and disaster monitoring. Many of the applications require the ability to detect changes between images taken at successive time points. In spite of the fact that known methods exist in the art for detecting differences or changes between images taken from the same or similar angle, these methods are error prone due to the high rate of false alarm (FA) change detections. False alarm detection is typically caused by two dimensional differences (such as shadow changes) between the images that do not actually reflect a true, physical, three dimensional ("volumetric") difference such as a structure appearing in a location previously unoccupied, or a vehicle no longer appearing in a location where it appeared in a previous image. Shadow change, for example, may be caused by a change in the illuminating source position. In addition, other factors that change with time such as seasonal changes, weather conditions, level of moisture in the ground and other factors would create changes in the way objects are reflected in a scene at different times. However, volumetric, three dimensional changes would likely reflect the appearance, disappearance or displacement of objects with true physical volume such as houses, automobiles, trash bins and so on. In order to decrease FA errors it is beneficial to detect and classify those true volumetric changes.

A preferred approach used to increase the detection sensitivity of volumetric difference would be to first create three dimensional ("3D") representations of the area (each corresponding to a different time point), and then compare those 3D representations in order to detect 3D changes. In order to create a 3D representation of an area, two or more images of the same scanned area each taken from different angles ("stereoscopic images") are used. However, despite the fact that the above approach would theoretically improve the volumetric detection sensitivity, it is hampered by the technological complexity of registering images of the same scanned area taken from different angles ("stereo-matching"). Stereo images taken from increased angle difference (termed "wide baseline stereoscopic images", also known in the art as stereoscopic images having high base over height ("B over H") ratio), are more difficult to stereo-match.

In the text that follows, the term "stereo-matching" represents the process of associating points between two stereoscopic images (one point from each image) in order to generate pairs of "correspondence points". Each pair of points is assumed to represent the same physical entity in the scene as reflected in the two stereoscopic images. The product of the stereo-matching process is either a sparse set of correspondence points (limited number of pairs) or a dense set of correspondence points (also known in the art as "dense stereo matching") in which a pair of correspondence points is defined for every pixel covered by both images of the stereo-pair. A depth map (a three dimension representation of the scenery) can be produced from a dense set of correspondence points.

The following is a list of related art:

US2006/0239537 published Oct. 26, 2006 and entitled "Automatic processing of aerial images" discloses a change detection apparatus for detection of changes between first and second stereoscopic image pairs obtained at different times of a substantially similar view. The apparatus comprises a two-dimensional image filter for comparing first and second image pairs to obtain an initial list of change candidates from two-dimensional information in the image pairs, and a three-dimensional image filter for comparing the image pairs at locations of the change candidates using three-dimensional image information. The apparatus retains those change candidates correlating with three-dimensional image change and rejects change candidates not correlating with three-dimensional image change, and produces a refined list of change candidates.

U.S. Pat. No. 4,975,704 entitled "Method for detecting surface motions and mapping small terrestrial or planetary surface deformations with synthetic aperture radar" discloses a technique based on synthetic aperture radar (SAR) interferometry is used to measure small surface deformations (1 cm or less) with good resolution (10 in) over large areas (50 km). Two SAR images are made of a scene by two spaced antennas and a difference interferogram of the scene is made. After unwrapping phases of pixels of the difference interferogram, surface motion or deformation changes of the surface are observed. A second interferogram of the same scene is made from a different pair of images, at least one of which is made after some elapsed time. The second interferogram is then compared with the first interferogram to detect changes in line of sight position of pixels. By resolving line of sight observations into their vector components in other sets of interferograms along at least one other direction, lateral motions may be recovered in their entirety. There is a need in the art for image stereo-matching of images taken at widely different viewing angles e.g. wide baseline stereo images.

There is a further need in the art to compare images taken at different times and to reliably detect volumetric changes between them such as a new construction site or military facility.

SUMMARY OF THE INVENTION

The invention illustrates a method for registering stereoscopic images, the method comprising:
a) obtaining at least two sets of stereoscopic images, each one of said at least two sets including at least two images that are taken from different angles;
b) determining at least two groups of images, each group including at least two images that are respective images of at least two of said sets or are derived therefrom; and
c) for each one of said groups, calculating a respective optimal entities list;
d) stereo-matching at least two images, each one being or derived from different one of said at least two groups and same or different sets, using at least four optimal entities from each one of said optimal entities list, thereby giving rise to at least one pair of registered stereoscopic images.

The invention further illustrates a method for detecting differences in a photographed scenery between two time points, the method comprising:
a) obtaining at least two sets of stereoscopic images, each one of said at least two sets including at least two images that are taken from different angles;
b) determining at least two groups of images, each group including at least two images that are respective images of at least two of said sets or are derived therefrom; and c) for each one of said groups, calculating a respective optimal entities list;
d) stereo-matching at least two images, each one being or derived from different one of said at least two groups and same or different sets, using at least four optimal entities from each one of said optimal entities list giving rise to at least one pair of registered stereoscopic images;
e) producing depth maps for at least two of said pairs of registered stereoscopic images; and
f) calculating height differences between corresponding regions of said depth maps;
   whereby volumetric differences are detected between said sets of stereoscopic images.

The invention still further illustrates a method for detecting differences in a photographed scenery between two time points, the method comprising:
a) obtaining at least two sets of stereoscopic images, each one of said at least two sets including at least two images that are taken from different angles;
b) determining at least two groups of images, each group including at least two images that are respective images of at least two of said sets or are derived therefrom; and
c) for each one of said groups, calculating a respective optimal entities list;
d) stereo-matching at least two images, each one being or derived from different one of said at least two groups and same or different sets, using at least four optimal entities from each one of said optimal entities list of said optimal entities list giving rise to at least one pair of registered stereoscopic images;
e) producing depth maps for at least two of said pairs of registered stereoscopic images, at least within regions derived from coordinates of candidate entities of said candidate entities list; and
f) reassessing candidate entities from said candidate entities list against at least two of said depth maps; and
wherein said candidate entities are classified as volumetric differences if the reassessment shows height difference.

The invention still further illustrates a method for detecting differences in a photographed scenery between two time points, the method comprising:
a) obtaining at least two sets of stereoscopic images of said scenery, each one of said at least two sets including at least two images that are taken from different angles;
b) generating at least two pairs of registered stereoscopic images, each one of said pairs includes stereoscopic images from one of said sets respectively;
c) calculating a depth map for each one of said pairs of registered stereoscopic images; and
d) calculating height differences between corresponding regions of said depth maps;
   whereby volumetric differences are detected between said sets of stereoscopic images.

The invention still further illustrates a system for registering stereoscopic images, the system comprising:
a processor and associated storage, said processor and associated storage are configured to perform at least the following:
   a) obtain at least two sets of stereoscopic images, each one of said at least two sets including at least two images that are taken from different angles;
   b) determine at least two groups of images, each group including at least two images that are respective images of at least two of said sets or are derived therefrom; and
   c) for each one of said groups, calculate a respective optimal entities list;
wherein at least four optimal entities from each one of said optimal entities list are configured to be fed to a stereo-matching module which stereo-matches at least two images, each one being or derived from different one of said at least two groups and same set or different sets, using said optimal entities, thereby giving rise to at least one pair of registered stereoscopic images.

The invention further illustrates a system for detecting differences in a photographed scenery between two time points, the system comprising:
a processor and associated storage, said processor and associated storage are configured to perform at least the following:
   a) obtain at least two sets of stereoscopic images of said scenery, each one of said at least two sets including at least two images that are taken from different angles;
   b) generate at least two pairs of registered stereoscopic images, each one of said pairs includes stereoscopic images from one of said sets respectively;
   c) calculate a depth map for each one of said pairs of registered stereoscopic images; and
   d) calculate height differences between corresponding regions of said depth maps;
      whereby volumetric differences are detected between said sets of stereoscopic images.

The invention still further illustrates a program storage device readable by machine, tangibly embodying a program of instructions executable by the machine to perform method operations for registering stereoscopic images, comprising:
   a) obtaining at least two sets of stereoscopic images, each one of said at least two sets including at least two images that are taken from different angles;
   b) determining at least two groups of images, each group including at least two images that are respective images of at least two of said sets or are derived therefrom; and
   c) for each one of said groups, calculating a respective optimal entities list;
wherein at least four optimal entities from each one of said optimal entities list are configured to be fed to a stereo-matching module which stereo-matches at least two images, each one being or derived from different one of said at least two groups and same set or different sets, using said optimal entities, thereby giving rise to at least one pair of registered stereoscopic images.

According to an embodiment of the invention, each of the groups includes at least two images that (i) are respective images of at least two of the sets or are derived therefrom, and (ii) are taken from acquisition angles within a range of 5 degrees or less.

The invention further illustrates a program storage device readable by machine, tangibly embodying a program of instructions executable by the machine to perform method operations for detecting differences in a photographed scenery between two time points comprising:
   a) obtaining at least two sets of stereoscopic images of said scenery, each one of said at least two sets including at least two images that are taken from different angles and;
   b) generating at least two pairs of registered stereoscopic images, each one of said pairs includes stereoscopic images from one of said sets respectively;
   c) calculating a depth map for each one of said pairs of registered stereoscopic images; and
   d) calculating height differences between corresponding regions of said depth maps;
      whereby volumetric differences are detected between said sets of stereoscopic images.

The invention further illustrates a method for registering stereoscopic images, the method comprising:
a) obtaining at least two sets of stereoscopic images, each one of said at least two sets including at least two images that are taken from different angles;
b) determining at least two groups of images, each group including at least two images that are respective images of at least two of said sets or are derived therefrom; and
c) for each one of said groups:
i. registering at least two of said group's images;
ii. detecting changes between the registered images thereby giving rise to a candidate entities list; and
iii. selecting at least four optimal entities from said candidate entities list in accordance with at least one selection criterion, thereby giving rise to said optimal entities list;

wherein at least four optimal entities from each one of said optimal entities list are configured to be fed to a stereo-matching module which uses said optimal entities to stereo-match at least two images, each one being or derived from different one of said at least two groups, thereby a successful stereo-match of said at least two images is achieved.

The invention further illustrates a method comprising:
a) producing depth maps for at least two of said pairs of registered stereoscopic images; and
b) calculating height differences between corresponding regions of said depth maps whereby volumetric differences are detected between said sets of stereoscopic images.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1A:
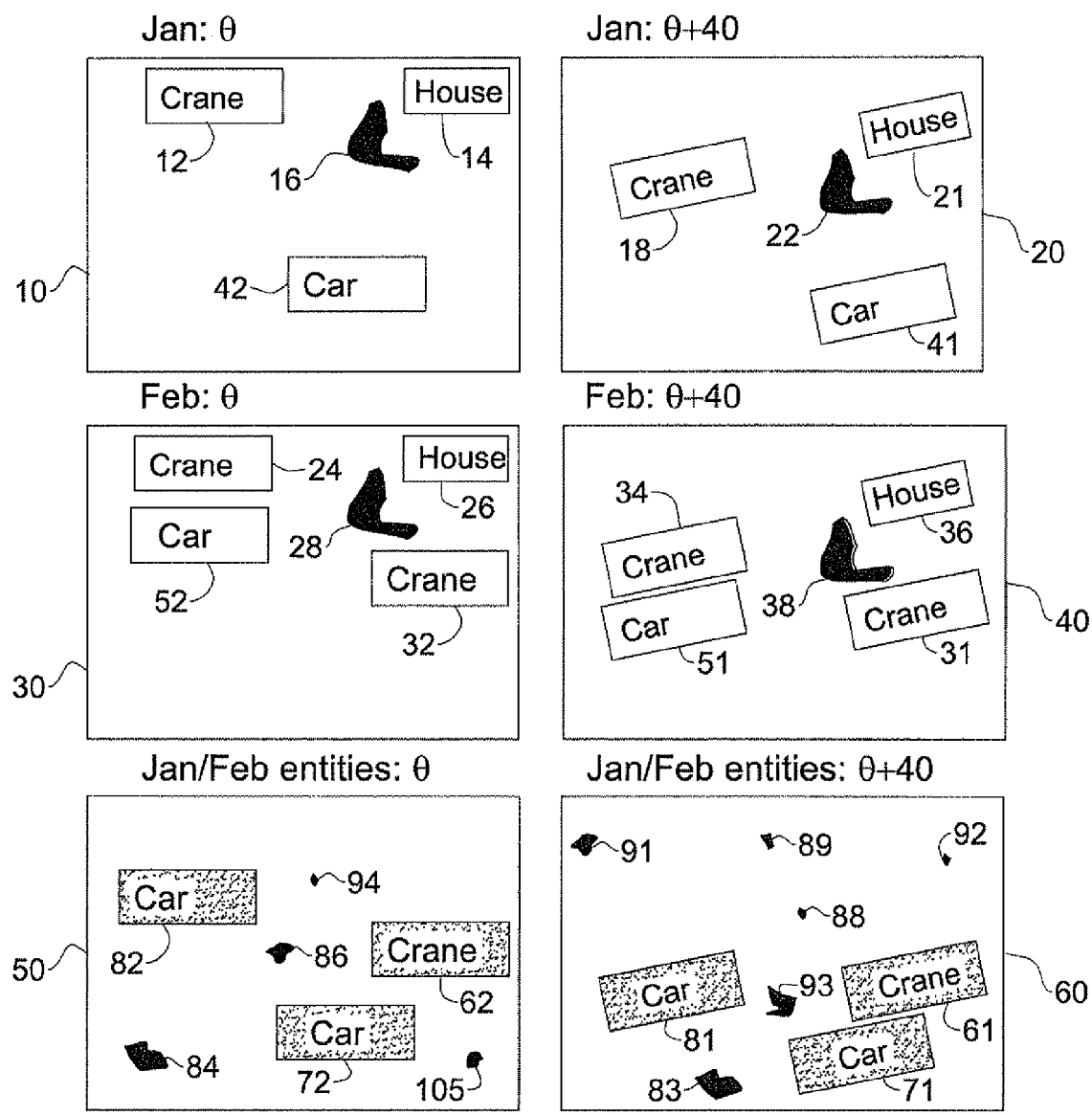
FIGS. 1A-C are a schematic illustration of a simplified scenario in accordance with certain embodiments of the present invention.

The principles and operation of a remote sensing imagery system and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. In accordance with certain embodiments of the present invention, the phraseology and terminology which involves the word "stereo" (such as "stereoscopic images", "stereo matching" and the like) is numerically non-limiting and should be interpreted as two or more i.e. stereo images may be interpreted as two or more images, including a common scene and taken from two or more acquisition angles. Stereo matching of images may be interpreted as matching two or more stereo images.

In accordance with certain embodiments of the present invention, sets of images, each set taken at a different time point and containing stereoscopic images (termed hereafter "sets of stereoscopic images"), are used in order to facilitate the process of stereoscopic images registration. This allows, in accordance with certain embodiments of the present invention, for accurate height/depth estimation and subsequently enables volumetric change detection.

In accordance with certain embodiments of the present invention, the stereoscopic images used are wide baseline stereoscopic images.

In accordance with certain embodiments of the present invention, the term "wide baseline stereoscopic images" denotes images, containing a common scene, which were taken from acquisition angles at least 10 degrees different.

In accordance with certain embodiments of the present invention, the term "wide baseline stereoscopic images" denotes images, containing a common scene, which were taken from acquisition angles at least 25 degrees different.

In accordance with certain embodiments of the present invention, the term "wide baseline stereoscopic images" denotes images, containing a common scene, which were taken from acquisition angles at least 35 degrees different.

In accordance with certain embodiments of the present invention, the term "wide baseline stereoscopic images" denotes images, containing a common scene, which were taken from acquisition angles at least 45 degrees different.

A basic example of an explanatory scenario will now be presented and will be followed by a demonstration of the method according to certain embodiments of the present invention. Importantly, this example is non-limiting and over simplified for the sake of clarity only.

A surveillance airborne platform (e.g. an airplane, Unmanned Aerial Vehicle (UAV), etc.) passes above an area of interest once a month ("monthly flight leg or mission") and takes images of the area from several angles each month.

Turning to the drawings and referring first to FIG. 1A, Images 10 and 20 are two stereoscopic images (out of the batch of images acquired in January's flight leg which are termed "set of stereoscopic images" taken in January) taken from two different angles, e.g. θ° and θ°+40° respectively. Images 30 and 40 are two stereoscopic images (out of the set of stereoscopic images acquired in February's flight leg), taken from two different angles, e.g. θ° and θ°+40°, respectively. Images 10 and 20 belong to one set and images 30 and 40 belong to a second set. Image 10 includes a crane 12, house 14, lake 16 and a car 42. Image 20 includes the same objects detailed in image 10: a crane 18, house 21, lake 22 and car 41.

Image 30 includes a crane 24 which is the same crane at the same location as 12, house 26 which is the same house at the same location as 14, lake 28 which is the same lake at the same location as 16, a car 52 which is the same car as car 42 but at a different location and a second crane 32. Image 40 includes the same objects detailed in 30: a crane 34 which is the same crane at the same location as 18, house 36 which is the same house at the same location as 21, lake 38 which is the same lake at the same location as 22, car 51 which is the same car as car 41 but at a different location and a second crane 31.

Between the times the images were taken in January and February, several changes occurred: a second crane has appeared 31, 32 and the car, seen in the January images 41, 42, has changed location in the February images 51, 52.

The method of registration of the two stereoscopic images 30 and 40 and also 10 and 20 will be exemplified below according to certain embodiments of the present invention.

In accordance with certain embodiments of the present invention, groups of images (from here on termed "groups of images"), each including two or more images taken from similar angles but at different times (i.e. from different sets) are registered and then compared for changes (a process termed "change detection") as detailed below. In accordance with certain embodiments of the present invention the images used are not the original images obtained but derived (further processed) images. The derived images may first be processed in accordance with methods known in the art. For example, image resolution may be changed, color enhancement processing may be performed, etc.

According to certain embodiments, the original images are processed in order to facilitate both the process of change detection and the process of stereo matching. For example, before proceeding with the change detection process the images are usually histogram matched, a global tone mapping procedure which ensures that the two images are most similar in as far as the distribution of gray levels in the two images is concerned. With regard to the stereo-matching, the images of the stereo pair must both be optimally focused. Defocusing or blur of one or both images in the stereo pair deteriorates the accuracy of the final depth map (a term explained below). Deblurring or defocusing phenomena are very often experienced particularly when the camera is moving during the exposure time or the photographed objects are moving during the exposure time. Therefore procedures for focusing or deblurring the image are employed as required according to the specific application.

The registration of images from each group may be done according to any one of several methods known in the art. Image (Jan; θ°), shown in A, is registered with image (Feb; θ°), shown in C. Once the two images are registered, each pixel is compared with the corresponding (registered) pixel from the other image.

Figure 2:
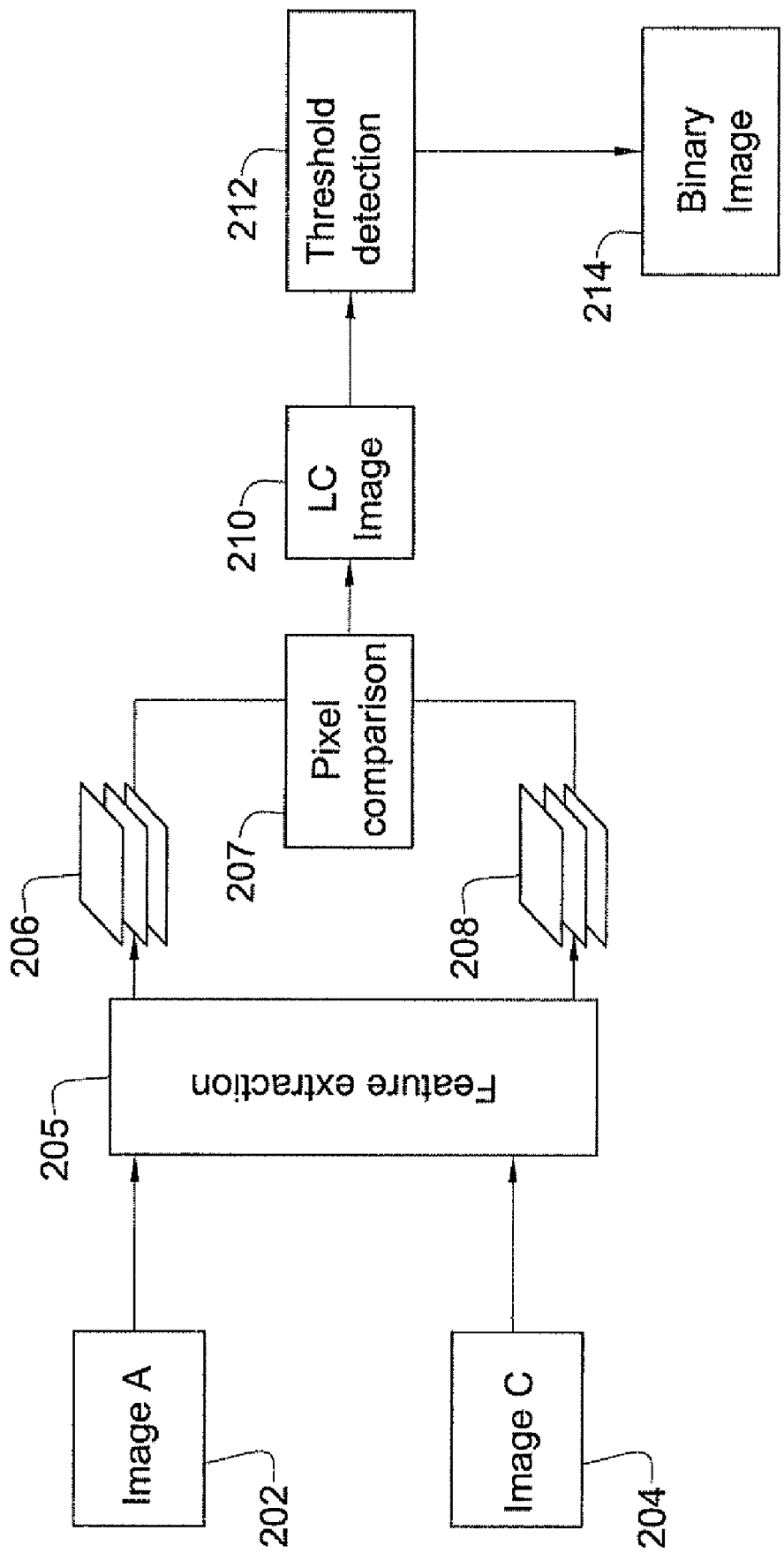
FIG. 2 is a flow chart illustrating a sequence of operations in accordance with certain embodiments of the present invention.

In accordance with certain embodiments of the present invention, change detection between 10 and 30 is carried out according to the flowchart presented in FIG. 2. The input to the process of change detection is a pair of registered images e.g. image A (202) and image C (204). Each pixel in each image is processed to extract features for change detection, 205. Possible features used for change detection may be intensity based, texture based and color based features, for example. Examples of intensity based features are local mean and local standard deviation. Texture features contain information about the spatial distribution of tonal variations in the neighborhood of the pixel. Textural features used in the art are: Edge gradients or grey level difference vector (GLDV), co-occurrence matrix (GLCM), spatial correlation functions and model-based approaches such as Markov Random Fields (MRF). In accordance with to certain embodiments of the present invention, both intensity based and texture based features are computed by means of convolving the image with a sliding window. The window size is chosen to be an odd number such as 3, 5, 7, 9, etc. such that the middle pixel in the window is assigned with the computed value of the window.

Color based features are pixels values. Typical examples of color based features are Red-Green-Blue (RGB) vectors and several other transformation of the RGB color space such as Hue-Saturation-Value (HSV), LaB and others. After feature extraction in each image, a vector of features is obtained for each pixel where each component of the vector represents the value of the particular feature at that pixel's location. Each feature can be regarded as a new image plane. In the flowchart example, three features were extracted. The three feature planes (comprising three values vector for each pixel of the image) for image 202 and 204 are shown (206 and 208, respectively). Pixel comparison 207 equates to comparison of two vectors per each pixel. This can be accomplished in many alternative ways known in the art. For example, one can compare each component of the vector and then compute the resultant residual value. For two equal vectors this should be small. Another possible way would be to compute the dot product of the two vectors. In this case for equal vectors, e.g. "no change", the normalized dot product should be close to unity. In any case, the resultant end product of this stage is a normalized (usually between 0-1) likelihood of change (LC) image, 210. High values in the LC image represent likelihoods of a definite "change", whereas low values in LC represent likelihoods of "no change". The normalized likelihood of change image LC is compared to a threshold to detect "candidate" locations for changes 212. The threshold used at this stage is a global threshold which may be quite permissive e.g. accept all possible changes including those with a relatively weak likelihood of change. All locations in the LC image bigger than the threshold are assigned the value 1 and locations with LC values less than the threshold are assigned the value zero. This operation is called "image binarization". A binary matrix 214 (composed of pixels having the values "0" and "1" only; also known as "binary image") carries the result of the pixels comparison. For each pixel (represented by a pair of coordinates) where a change is detected, the value 1 is inserted. All the other pixels in the binary image get the value "0".

Returning to FIG. 1A, 50 and 60 are the two binary images resulting from the change detection 10-30 and 20-40, respectively. Areas of "1" and "0" value pixels are shown in gray and white, respectively.

In accordance with certain embodiments of the present invention, all pixels assigned value 1 are clustered into objects (termed "candidate entities") by what is known in the art as a connected components labeling procedure. Each candidate entity can be further characterized by a number of features. For example, some explicit features measured on each candidate entity are: (1) Object Area, (2) Object Centroid, (3) Major Axis Length, (4) Minor Axis Length, and (5) Orientation.

The candidate entities are kept in a table termed "candidate entities list".

Figure 3:
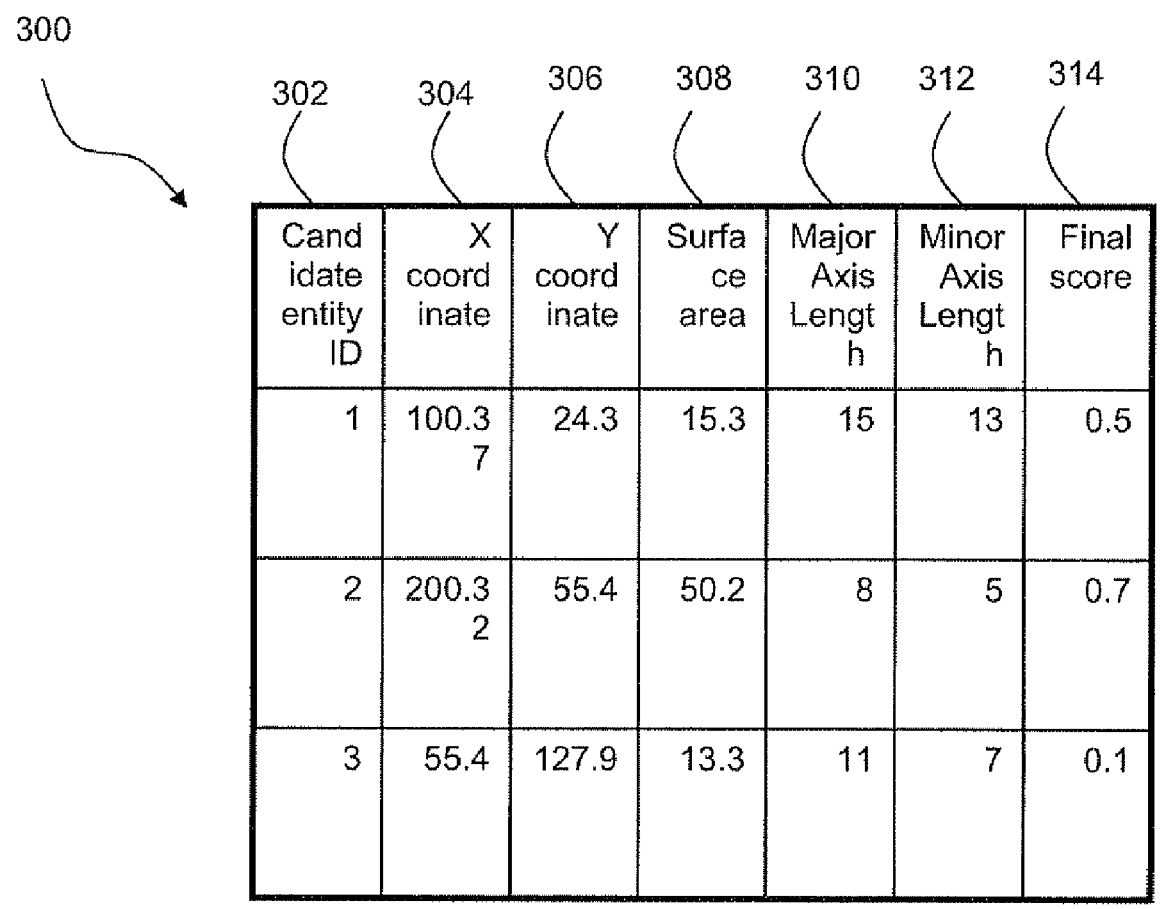
FIG. 3 illustrates a table representation of a candidate entities list in accordance with certain embodiments of the present invention.

An example of the candidate entities list is given in FIG. 3.

In accordance with certain embodiments of the present invention, each candidate entity is associated with a set of coordinates representing the candidate entity's location in the image (for example using a pair of values, one represents the location with regard to the horizontal axis and the second with regard to the vertical axis). Different possible methods for calculating such a set of coordinates are known in the art.

In accordance with certain embodiments of the present invention, the coordinates of a single pixel (termed "gravity point") are used. For example, the gravity point's horizontal and vertical coordinates may be calculated by averaging the horizontal and vertical coordinates of all the "1" pixels of the candidate entity from the corresponding binary image.

Table 300 in FIG. 3 represents a candidate entities list in accordance with certain embodiments of the present invention. The table includes an internal identity number which is given for each candidate entity 302, the details of the gravity point (for example, as shown in the specific example shown in the table, the gravity point coordinates e.g. ($x_c$, $y_c$) are given (304, 306, respectively)), a number of values for features such as surface area 308, major axis length 310 and minor axis length 312 and a final score normalized to values between 0 and 1 (314). The final score is aggregated by combining for example, the area of the object, the ratio between the major axis length and the minor axis length and the mean value of the LC pixels composing the object. The final score is a credibility mark associated with a particular change.

Returning to FIG. 1A, in a similar manner to the process described above, image 20, is registered with image 40 and change detection is carried out. This process results in a second binary image 60 and in a second list of candidate entities.

The above described process involves registration of images taken from a similar angle (10 with 30 and 20 with 40). Note that some deviation in the angle of image acquisition between the different sets, (due to reasons such as photographing platform flight course inaccuracies and others) is possible and acceptable. For example, image 10, acquired from angle $\theta°$ may have been acquired at a slightly different angle than image 30 ($\theta° \pm \delta$) but for sake of convenience, they are both described as acquired at the same angle, $\theta°$.

In accordance with certain embodiments of the present invention, the term $\theta°$ will reflect either identical or substantially similar angle of acquisition.

In accordance with certain other embodiments of the present invention, the images that belong to the same group and are used for the change detection process were taken from two acquisition angles, 5 degrees apart at most.

The result of the process described above is two binary images 50 and 60 representing the detected changes, defining two lists of candidate entities, one at angle $\theta°$ and the second at angle $\theta° \pm 40°$.

The change detection process between image 10 and image 30 results in a list of candidate entities that includes crane 62 and two changes resulting from the disposition of the car: 72, 82. Also included in the list of candidate entities are several other candidate entities which are not actual volumetric changes, such as shadows 84, 86, 105 and changes due to noise (e.g. in the process of image acquisition) 94.

The comparison between image 20 and image 40 reveals three changes: crane 61 and two changes resulting from the disposition of the car: 71, 81. Also included in the list of candidate entities are several other candidate entities which are not actual volumetric changes, such as shadows 83, 89, 93 and changes due to noise 91, 92, 88.

In accordance with certain embodiments of the present invention, the stereo-matching of the two stereoscopic images 10 and 20 is initiated using several pairs of tie-points (termed "seed correspondence points"). In each pair one seed correspondence point is derived from one list of candidate entities and the other seed correspondence point from the second list. The process of deriving seed correspondence points from the candidate entities lists is explained below.

In accordance with certain embodiments of the present invention, a sub group of candidate entities (termed "optimal entities") is chosen from the candidate entities list by using certain criteria.

In accordance with certain embodiments of the present invention, in order to select optimal entities from among the candidate entities, the two lists of candidate entities are first evaluated with regard to a predetermined criterion (termed "selection criterion") and then selected accordingly.

For example, a candidate entities area criterion may be used. The candidates' area is used as a means to eliminate small irrelevant candidate entities and also overly large candidate entities from further consideration. The features of each candidate entity as shown in FIG. 3 may therefore be used in order to test the candidate entities and select the optimal entities.

Figure 1B:
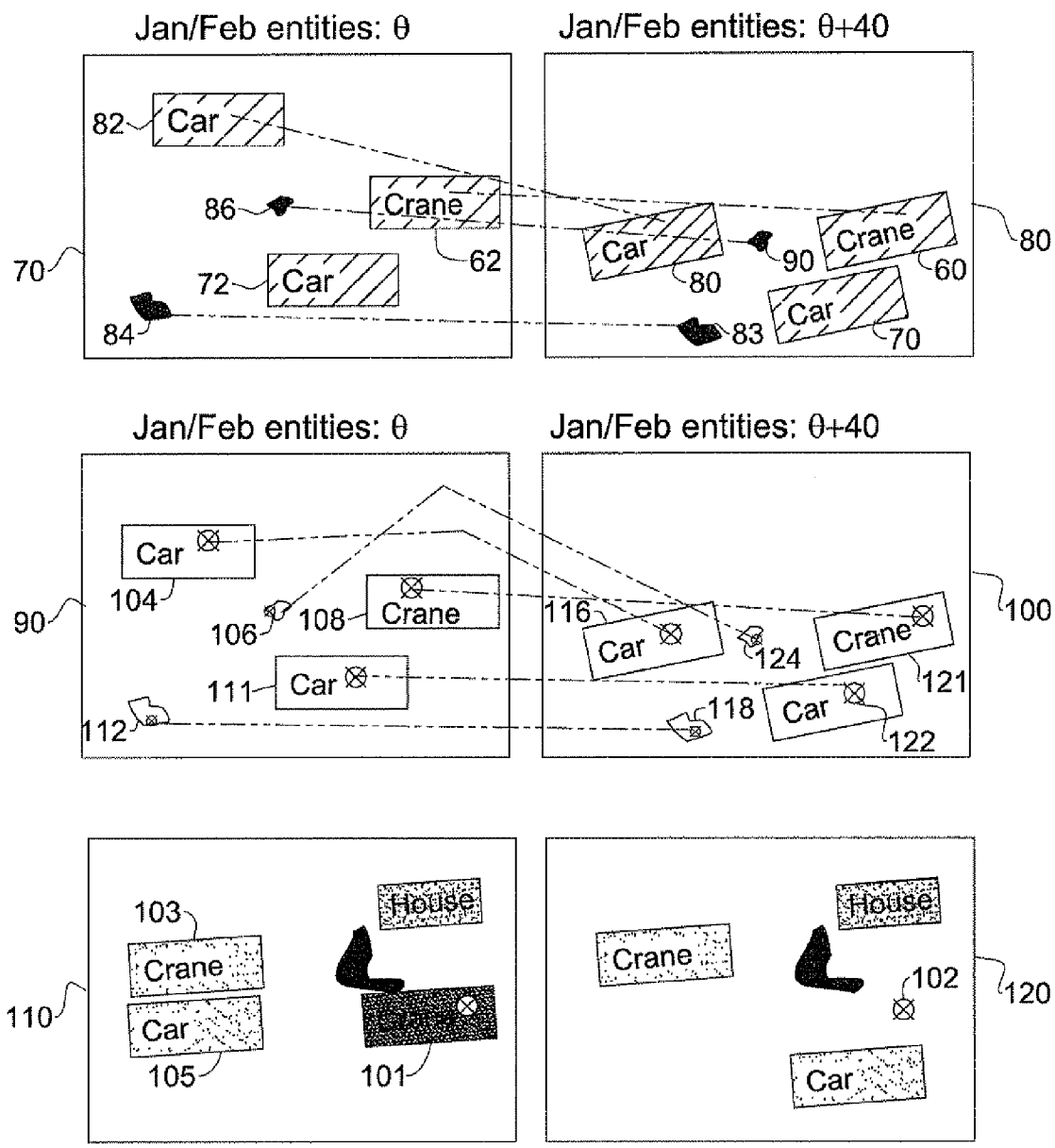

Reverting to 50 and 60 in FIG. 1A, two sub-groups of candidate entities, one from each image, are selected. In the present example the entities were evaluated based on the surface area criterion and were selected accordingly. In this particular example, only candidate entities whose area exceeds a certain threshold are selected from each candidate entity list. Therefore candidate entities 94, 86, 105 from 50 and candidate entities 88, 89, 91 and 92 from 60 are dismissed and the remaining selected entities 62, 72, 82, 84, 86 and 61, 71, 81, 83, 93 are shown in FIG. 1B 70 and 80, respectively.

The above described area criterion depends on a feature of the candidate entity by itself. In accordance with certain embodiments of the present invention, each candidate entity from one list is matched to a candidate entity from the second list. In the case where a candidate entity cannot be matched with a corresponding candidate entity from the second list, it is eliminated from further consideration. Again, the features of each candidate entity as shown in FIG. 3 are useful for the purpose of candidate entities pairing. As shown by dotted lines between 70 and 80, the characteristics features profile of each candidate entity (i.e. surface area, color etc.) is used in order to match a candidate entity from 70 with the likely corresponding candidate entity from 80. For example, two candidate entities are paired if they have substantially the same surface area, or substantially the same major axis length to minor axis length ratio. This way 82, 86, 62, 84 and 72 are matched with 81, 93, 61, 83 and 70, respectively.

In accordance with certain embodiments of the present invention, the pairing process may be another stage where candidate entities are eliminated. For example, a candidate entity would be eliminated if it could not pair with a single candidate entity from the other candidate entities list.

The retained candidate entities are the "optimal entities" and are transferred to the final list of detections termed "optimal entities list". Note that in the present example only two groups of images are specified in a non-limiting manner and in accordance with certain embodiments of the present invention; multiple groups of images may be used to select multiple lists of seed correspondence points.

In accordance with certain embodiments of the present invention, multiple selection criteria are used in order to select the optimal entities. For example, each candidate entity may be evaluated with respect to the area criterion and additionally with respect to the color criterion.

In accordance with certain embodiments of the present invention, the gravity points which were previously determined for each candidate entity are now used again. Each optimal entity's gravity point is paired with the corresponding gravity point from the other stereoscopic image according to the shape and color matching criteria mentioned above. The gravity points of the optimal entities are termed seed corresponding points and are used to initiate the comprehensive stereo-matching process. The gravity points' pairing follows their corresponding candidate entity pairing. 90 and 100 show the result of the gravity point pairing process: gravity points 104, 106, 108, 111 and 112 are paired with 116, 124, 121, 122 and 118, respectively. Those paired seed corresponding points are used as "tie-points" to initiate a comprehensive stereo matching registration process between the stereo images taken at the same time (e.g. taken in February). Those gravity points are utilized for the stereoscopic matching process as previously known in the art (a process also termed "anchoring") to give rise to the registered stereoscopic image.

In accordance with certain embodiments of the present invention the images used for the stereo-matching stage are not the original images obtained but derived (further processed) images.

In accordance with certain embodiments of the present invention, once the two images are correctly anchored by means of an initial set of seed corresponding points, the comprehensive stereo-matching process may now be initiated.

In accordance with certain embodiments of the present invention, in the stereo-matching process, the initial seed correspondence points matching may be followed by a comprehensive registration process of two types: the so-called sparse registration, in which a limited number of pixels per any given area of the images are paired across the stereoscopic images. Another type of registration process is the so-called dense registration (or "dense stereo matching") in which all pixels within a given area are paired across the stereoscopic images. (see for example: T. Krauβ, P. Reinartz, M. Lehner, M. Schroeder, U. Stilla, "DEM Generation from Very High Resolution Stereo Satellite Data in Urban Areas Using Dynamic Programming"; Y. Ohta, T. Kanade, "Stereo by intra and inter scanline search using Dynamic Programming", IEEE TPAMI 1985, 7(2): 139-154; I. J. Cox, S. Roy, S. L. Hingorani, "Dynamic histogram warping of image pairs for constant image brightness", IEEE ICIP 1995, (2): 366-369; D. Scharstein, R. Szeliski, "A Taxonomy and Evaluation of Dense Two-Frame Stereo Correspondence Algorithms"; S. Birchfield, C. Tomasi, "Depth Discontinuities by pixel to pixel stereo", ICCV 1998, pp 1073-1080; I. J. Cox, S. L. Hingorani, S. B. Rao, B. M. Magges, "A maximum likelihood stereo algorithm", CVIU 1996, 63(3): 542-567; D. Geiger, B. Ladendorf, A. Yuille, "Occlusions and binocular stereo", ECCV 1992, 425-433).

The product of the process of stereo-matching described so far is registered stereoscopic images for each of the different sets used. This allows for a next stage in which volumetric changes between the sets are detected. The term registered stereoscopic images denotes a list of pairs of matched pixels between any two stereo-matched images, and therefore is not shown as an image. The list may be represented by a table with the X and Y coordinates of each pixel in each pair.

In accordance with certain embodiments of the present invention, once the stereo-matching process has been fulfilled, the initial list of candidate entities is reassessed as being a volumetric change as will be further detailed below.

The comprehensive stereo matching process results in two registered stereoscopic images from which a three dimensional data representation of the area of interest can be produced (termed "depth map"). In accordance with certain embodiments of the present invention, depth maps are produced only in limited sections of the registered image ("local depth maps"). For example, local depth maps may be produced in the regions that correspond with the candidate entities circumference. In accordance with other embodiments of the present invention, a complete depth map is produced, covering the whole scenery. For example, based on the stereo matching of stereoscopic images acquired in February, the three dimensional image 110 shown in FIG. 1B is produced. The relative height of the surface may be presented using gray scale colors. Lighter colors represent higher altitude than darker colors as shown in 110 and 120 for the February and January registered stereoscopic images, respectively. The heights presented in those depth maps are relative heights meaning the height difference between any two points in the same depth map can be retrieved. In order to compare points between different depth maps, a process of height normalization may be required. This process results in the two depth images having a common overall height reference, so points where the height is not changed are represented by the same color. For example the pixel 101 (represented by a crossed circle) is at relative height +5 while pixel 102 (represented by a crossed circle) is at relative height +1. Therefore one may conclude that there has been a volumetric change in that particular pixel between January and February. Images 110 and 120 represent examples of complete depth maps (i.e. the relative height in each pixel derived from the original images is determined). An example of a local depth map would be the determination of relative height only within the area of the candidate entities 103 and 105. This way the two entities are tested for volumetric changes without the need to calculate the rest of the depth map.

In accordance with certain embodiments of the present invention, once the depth maps have been produced, the initial list of candidate entities is reassessed against them and each candidate entity is now checked and classified as either being flat or volumetric. Thus, reverting to images 50 and 60, each one of the entities shown in 50 or 60 is now reassessed according to the depth maps 110 and 120. If a candidate entity's coordinates show different heights between 110 and 120, it is classified as volumetric change. An example of a possible way to compare the height of a candidate entity between two depth maps is to calculate the average height of the pixel representing its gravity point and the eight pixels around it. In accordance with certain embodiments of the present invention, the whole area of the candidate entities may be used, by subtracting the height values in one depth map from the other, averaging the resulting values and comparing it to a threshold. Other alternative methods are known in the art including the procedure for change detection described above where the two depth maps are treated as gray level images.

For example, the gravity point of candidate entity 62 that appeared in 50 is superimposed on the three dimensional images 110 and 120 (101 and 102 respectively) and the color (which represents altitude) at the corresponding two images 110 and 120 is compared. As shown in 110 and 120, the relative height is different between the two images. The candidate entity is therefore reassessed as being a volumetric change.

In accordance with certain embodiments of the present invention, the volumetric change detection process result is a list of detected changes that may be passed on to automatic analysis tools for further categorization and documentation. It can also be used to derive a visualized image for a human user.

Figure 1C:
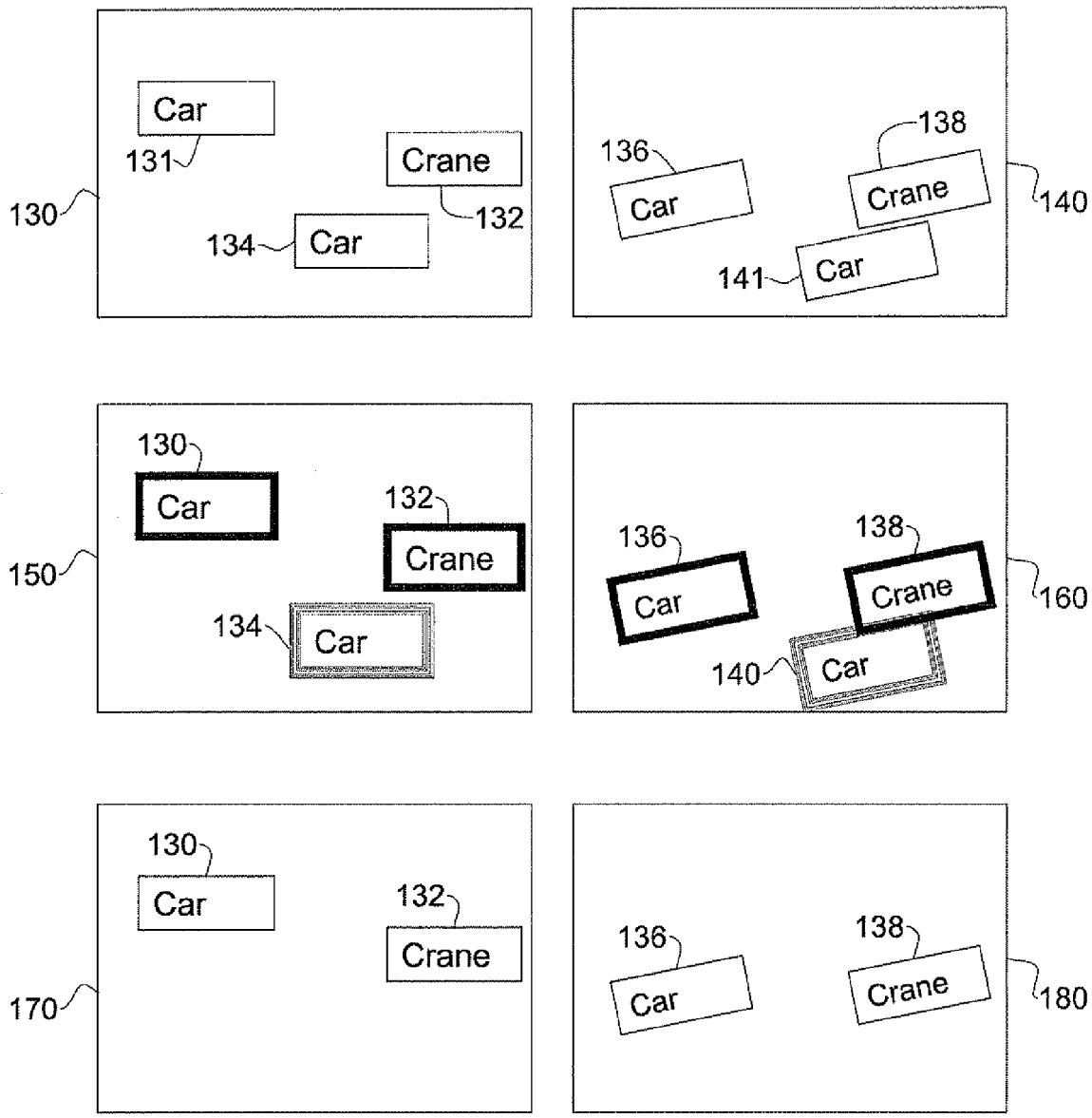

In accordance with certain embodiments of the present invention, the candidate entities that were reassessed as volumetric changes may be displayed as such to a user, using any one of numerous visualization methods that mark and emphasize the volumetric changes, in relation to the time the change has been detected. For example, referring to FIG. 1C, 130 and 140 present the complete group of detected volumetric changes between January and February. The entities shown in those images are the actual volumetric changes as previously reassessed: the car as it appeared in the February images 131, 136, the car as it appeared in the January images 134, 141 and the crane that appeared in the February images 132, 138.

In accordance with certain embodiments of the present invention, any one of the visualization methods detailed below and also other methods for presenting the volumetric changed entities may be displayed as an additional layer over the background of any one of the original stereoscopic images (10-40) or on the background of any one of the depth maps 110 or 120.

In accordance with certain embodiments of the present invention, it is beneficial and more relevant to present such changes with respect to the time the change occurred. For example, in the scenario described above, it might be beneficial to mark the volumetric difference in accordance with the month in which the object appeared. In 150 and 160 this additional information is incorporated by a graphical marking system in which the January differences are marked by a black frame around the entity and the February changes are marked by a striped frame.

In accordance with certain embodiments of the present invention, a display of those entities that appeared only at a specific time of acquisition (i.e. February) may be produced, for example with respect to the February set of stereoscopic images as shown in 170 and 180.

Up to this point, non-limiting examples of the method of registration of stereoscopic images and detection of volumetric differences have been shown. These non-limiting examples related to a scenario involving two pairs of images only, each pair belonging to one of two sets only. Each image in a pair belonging to one of two groups only, corresponding to one of two angles of acquisition ($\theta°$ and $\theta°+40°$, respectively). The present invention is not limited in its application to the details of construction and the features set forth in the above examples.

Following is a detailed explanation of the sequence of operations and the system architecture of the present invention.

Figure 4:
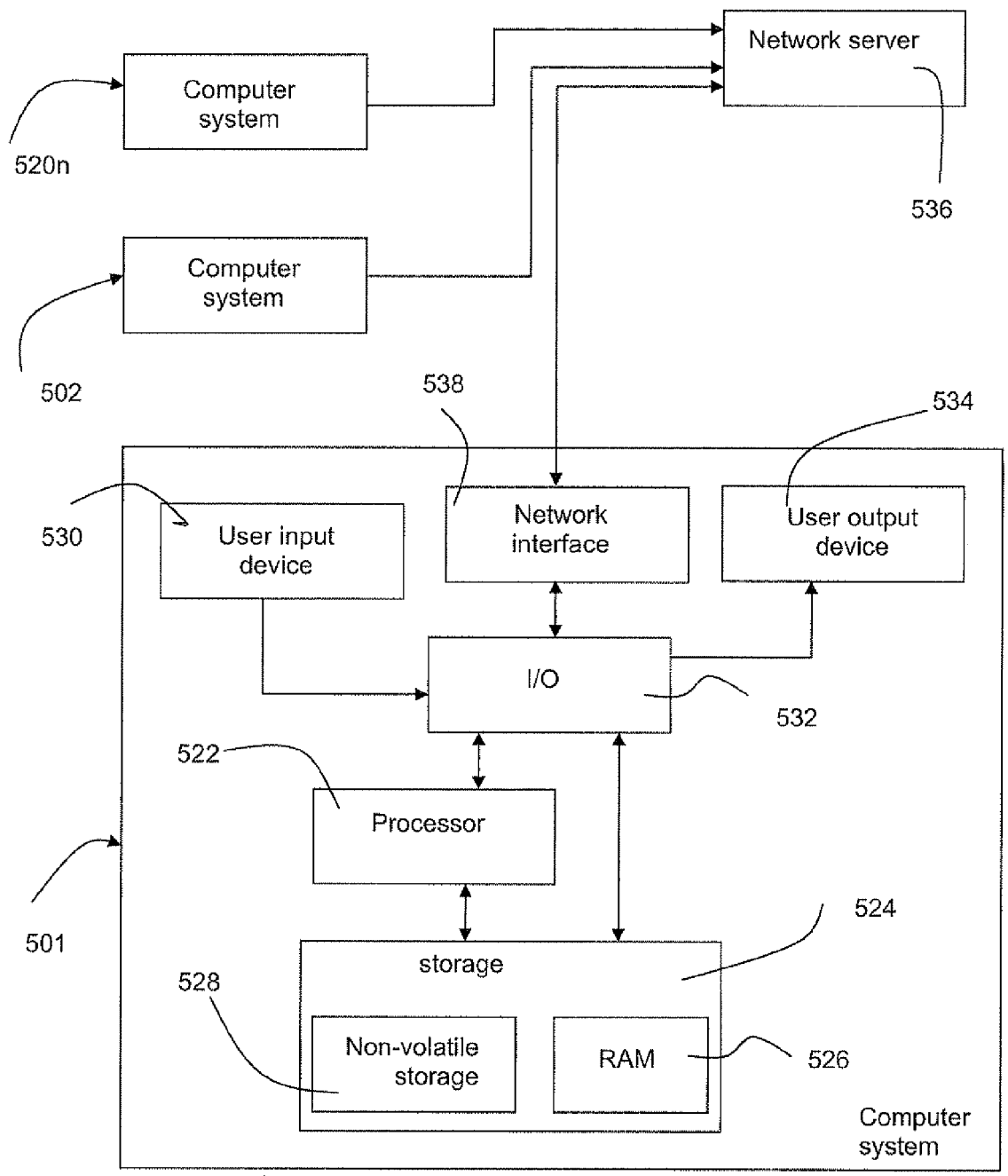
FIG. 4 illustrates general system architecture in accordance with certain embodiments of the present invention.

FIG. 4 illustrates general system architecture in accordance with certain embodiments of the present invention. Shown in FIG. 4 is a plurality of computer systems $520_1$-$520_n$, each of which is configured to perform the method stages that are described for example with reference to FIG. 5 and FIG. 6. Each of the computer systems such as the system $520_i$ includes a processor 522 operatively connected to storage 524, the storage including random access memory (RAM) 526 and non-volatile storage 528 such as a hard disk-drive, optical drive or the like. As can be appreciated, the non-volatile storage 528 can be used in conjunction with the RAM 526 to provide a relatively large amount of virtual memory via well-known swapping techniques.

The computer system $520_i$ also includes at least one input device 530, typically a keyboard and/or a user pointing device such as a mouse, connected through input-output circuitry (I/O) 532 for communicating user commands to the processor 522. Similarly, at least one local output device 534 such as a computer display monitor and speakers are connected to the I/O 532 for communicating information, such as via a graphical user interface, from the processor 522 to the user of the system $520_i$.

Although not necessary to the invention, the computer system $520_i$ preferably communicates with a network server 536 and/or other computers or the like via appropriate network interface circuitry 538. To this end, the circuitry 538 comprises local-area-network adapter cards, serial ports or the like whereby information may be passed to and from the computer system $520_i$. Such network connections are known and are not described in detail herein.

Figure 5:
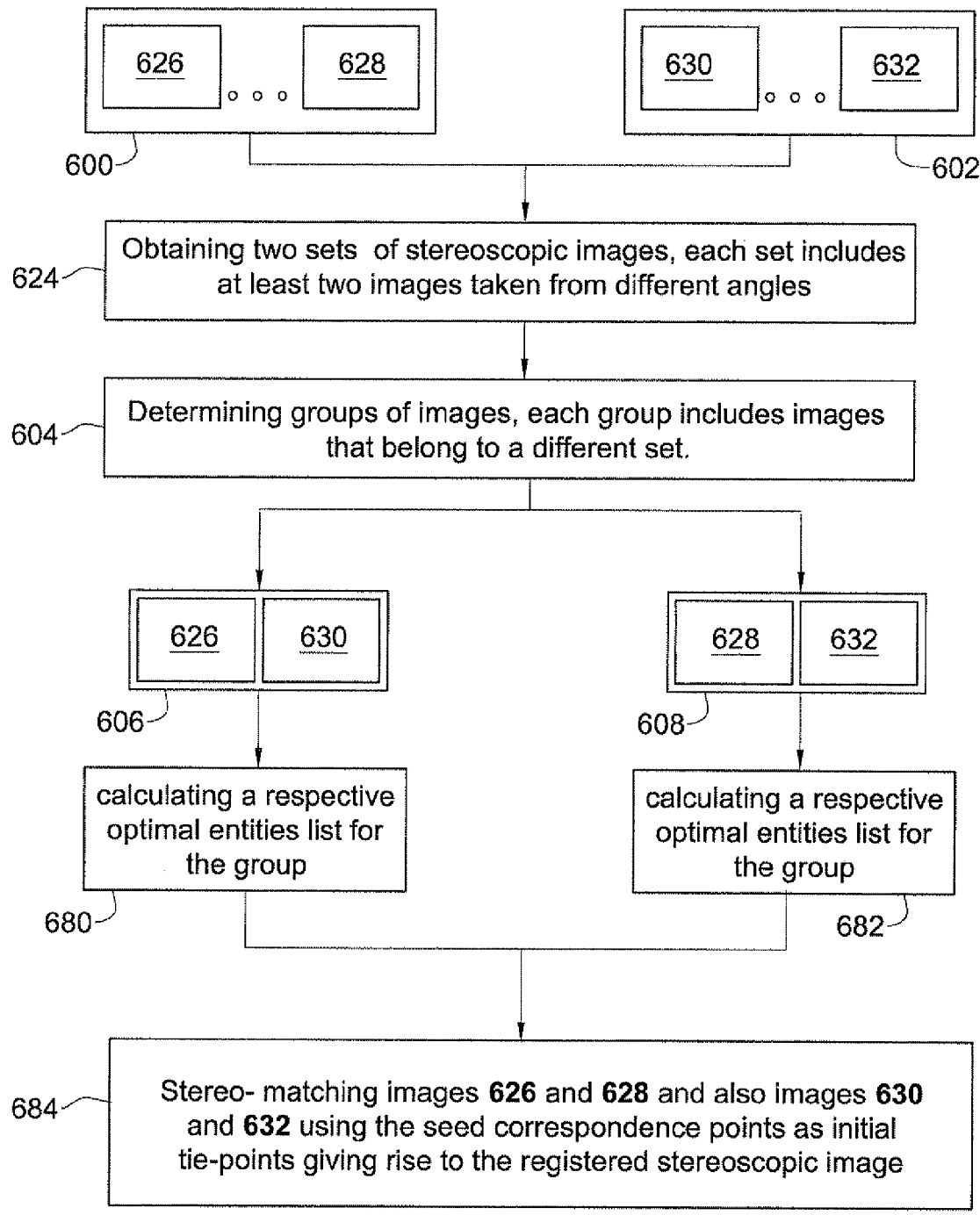
FIG. 5 illustrates a flow diagram for sequence of operations in accordance with certain embodiments of the present invention.

Bearing this in mind, attention is now drawn to FIG. 5 which illustrates a flow diagram for sequence of operations carried out by processor 522 of FIG. 4 in accordance with certain aspects of the present invention. The processor 522 of FIG. 4 is configured to perform the operations below. Thus, operation 624 includes obtaining two sets (600, 602) of stereoscopic images (the images are stored on a non-volatile storage 528 of FIG. 4), each one of the sets includes a number of images that include common scenery (e.g. common ground section). In the diagram of FIG. 5 images 626, 628 of set 600 include the same scenery from two different angles and images 630, 632 of set 602 include the same scenery from different angles. The way images are gathered to different sets is not limited by the method of the present invention. According to some embodiments, images are separated to different sets according to the flight leg they were taken i.e. all images taken at the same flight leg are gathered to one set. According to other embodiments, images may be separated into different sets according to time of image acquisition, for example, all images taken within the same daylight period are gathered into one set. In the present example, each set was taken at a different time. In accordance with certain aspects of the present invention, more than two sets may be obtained. In accordance with certain embodiments of the present invention, more than two images including the same scenery may be included in each set. For simplicity only, the diagram of FIG. 5 describes a scenario involving two sets each having two images only.

In accordance with certain aspects of the present invention the images 634, 636, 638 and 640 used are not the original images obtained but derived (further processed) images. The derived images may first be processed in accordance with methods known in the art. For example the images resolution may be changed; color enhancement processing may be performed etc.

In operation 604 groups of images 606, 608 are determined; each group includes one image from each of the sets. In accordance with certain embodiments, the images within a group were taken from substantially the same angle (point of view): 634, 636 and 638, 640, respectively.

According to certain other embodiments of the invention, the images within each group were acquired from a similar point of view. For example, in accordance with certain embodiments, all the images within the same group are taken from acquisition angles within a range of 10 degrees or less. In other words, there are no two images within the group with acquisition angle that are more than 10 degrees different.

This example is non-limiting and comes to illustrate the requirement of images within a group to have common scenery from relatively similar perspectives. Any known method intended to gather images to groups can be used. For example, in the case that the angle of acquisition for each image is not specified, trial and error (combinatorial) methods may be applied and the effectiveness of the grouping is measured in terms of the r group registration (or the final stereo-matching) quality or success as will be further elaborated below.

Returning to FIG. 5, in operation 680 and 682, a seed correspondence points list is produced for the group 606 and another seed correspondence points list is produced for the group 608. The seed correspondence points list may be calculated by registering and comparing the image within each group and detecting points, in the images which can be used as tie points later in the process. For example, detecting regions of change between the images.

In operation 684, images 626 and 628 are stereo-matched using the seeds from the seed correspondence points list as initial tie-points, thus a registered stereoscopic image is produced. Images 630 and 632 are also stereo-matched in a similar manner thus a second registered stereoscopic image is produced. The success of the stereo-matching process may be assessed by computing a normalized similarity measure (Q) for the stereo-matching process as would be elaborated below in relation to FIG. 7.

Figure 6A:
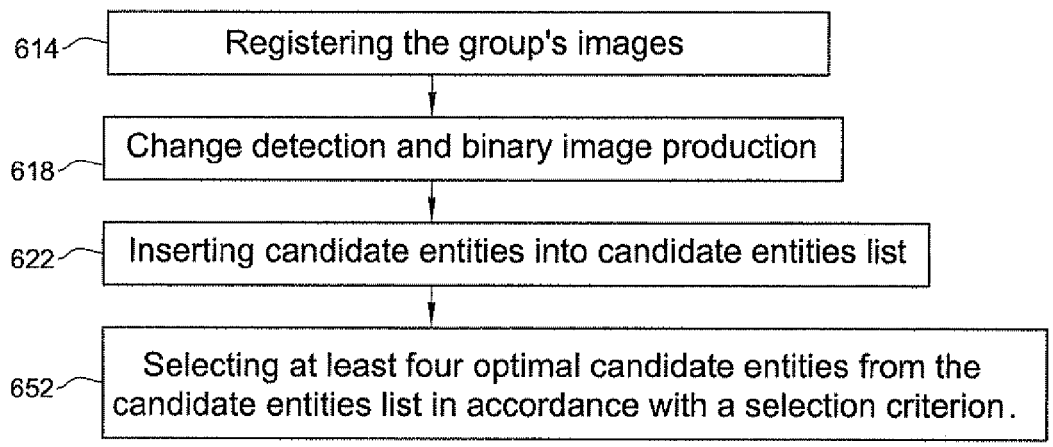
FIG. 6A-C illustrate a flow diagram for sequence of operations in accordance with certain embodiments of the present invention.
Figure 6B:
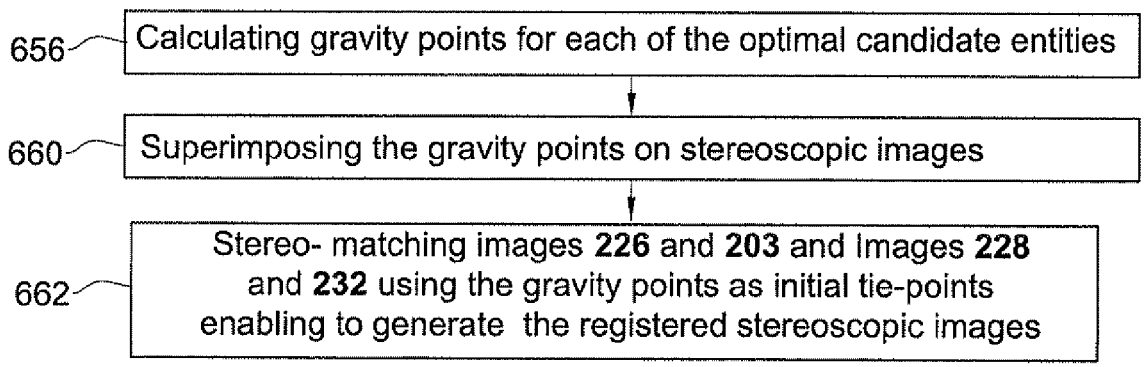
Figure 6C:
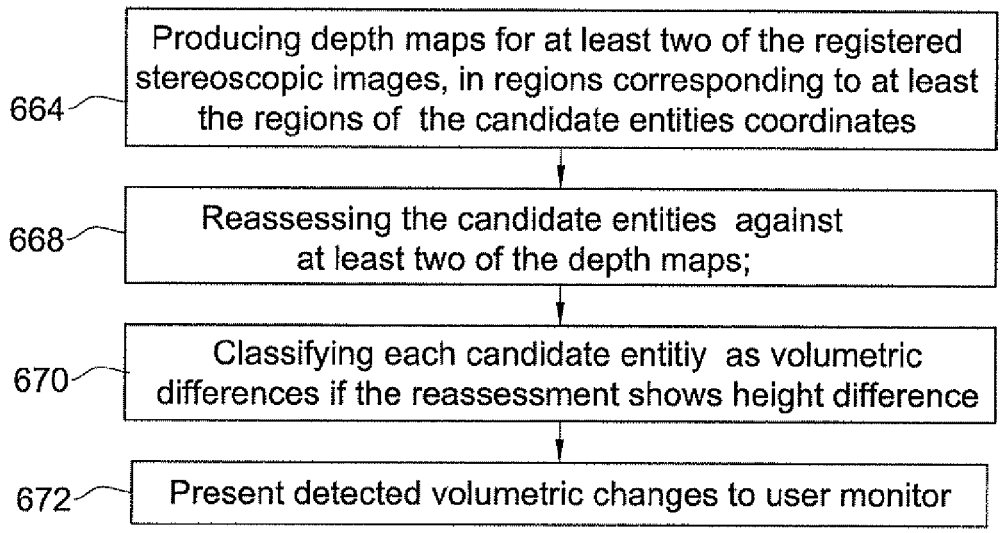

Referring to FIG. 6, in accordance with certain embodiments of the present invention, the operation of calculating a respective seed correspondence points list for each one of the groups may include the following operations. In operation 614 each group's images are registered. The success of the registration operation may be assessed by computing a normalized similarity measure as would be elaborated below in relation to FIG. 7.

In operations 618, change detection process is performed between images of the same group, and the product is a change binary image which reflects the detected changes. In operation 622, candidate entities are defined for each of the binary images and inserted into two candidate entities lists. Thus, each of the groups 606 and 608 now has a list of candidate entities associated with it. In operation 652 at least four optimal entities from among the candidate entities list of group 606 and at least four optimal entities from among the candidate entities list of group 608 are selected in accordance with a selection criterion.

In accordance with certain embodiments of the present invention, the operation of selecting at least four optimal entities from among the candidate entities list of group 606 and at least four optimal entities from among the candidate entities list of group 608 may include evaluating the candidate entities in accordance with at least one criterion from a group of selection criteria. These criteria may include for example a surface area size criterion. In this case, the candidate entities will be evaluated in accordance with their area size. As another example for a selection criterion, the candidate entities may be evaluated with respect to an intensity criterion. Darker candidate entities would be selected and brighter candidate entities dismissed.

In accordance with certain embodiments of the present invention, the operation of stereo-matching images 626 and 628 and also images 630 and 632 using the optimal entities as initial tie-points may include the following operations. Seed correspondence points are calculated for each of the optimal entities in operation 656. In accordance with certain embodiments of the present invention, gravity points were previously calculated for all the candidate entities and therefore are retrieved from the table of FIG. 3 rather than calculated. The seed correspondence points are superimposed on the stereoscopic images 626 and 603 and on images 628 and 632 in operation 660. In operation 662 images 626 and 603 are stereo-matched using the gravity points as initial tie-points, thus a pair of registered stereoscopic images is produced. Images 628 and 632 are also stereo-matched using the gravity points as initial tie-points, thus a second pair of registered stereoscopic images is produced.

Having described certain embodiments of the present invention, there is now provided a discussion of further elements which may be included in accordance with certain embodiments of the present invention. In operation 664 depth maps are produced for each one of the registered stereoscopic images, reflecting relative height of the scenery. The depth maps include at least the coordinates corresponding to the candidate entities coordinates. In operation 668 candidate entities from the candidate entities lists are reassessed against the two depth maps to find the relative height of each candidate entity as it appears in the depth maps and the relative height of each of those candidate entities is compared between the two depth maps. In operation 670, each of the reassessed candidate entities is classified as a volumetric difference in case the reassessment shows height difference between the depth maps in the previous operation. In operation 672 the volumetric detected changes are presented on a user output device 534 in FIG. 4.

It is to be understood that the invention is not limited in its application to the details and the arrangement of the operations set forth in FIG. 5-6. In accordance with certain embodiments of the present invention, certain operations of the flow diagram may be omitted or altered, others may be added and the order in which certain operations of the flow diagram are carried out may vary without departing from the scope of the above description and/or the Claims.

In the case that the angle of acquisition for each image is unknown, the sorting of the images to groups may be carried as explained below. In this case, the effectiveness of the grouping is measured in terms of the registration quality or success as further elaborated below with relation to FIG. 7.

Figure 7:
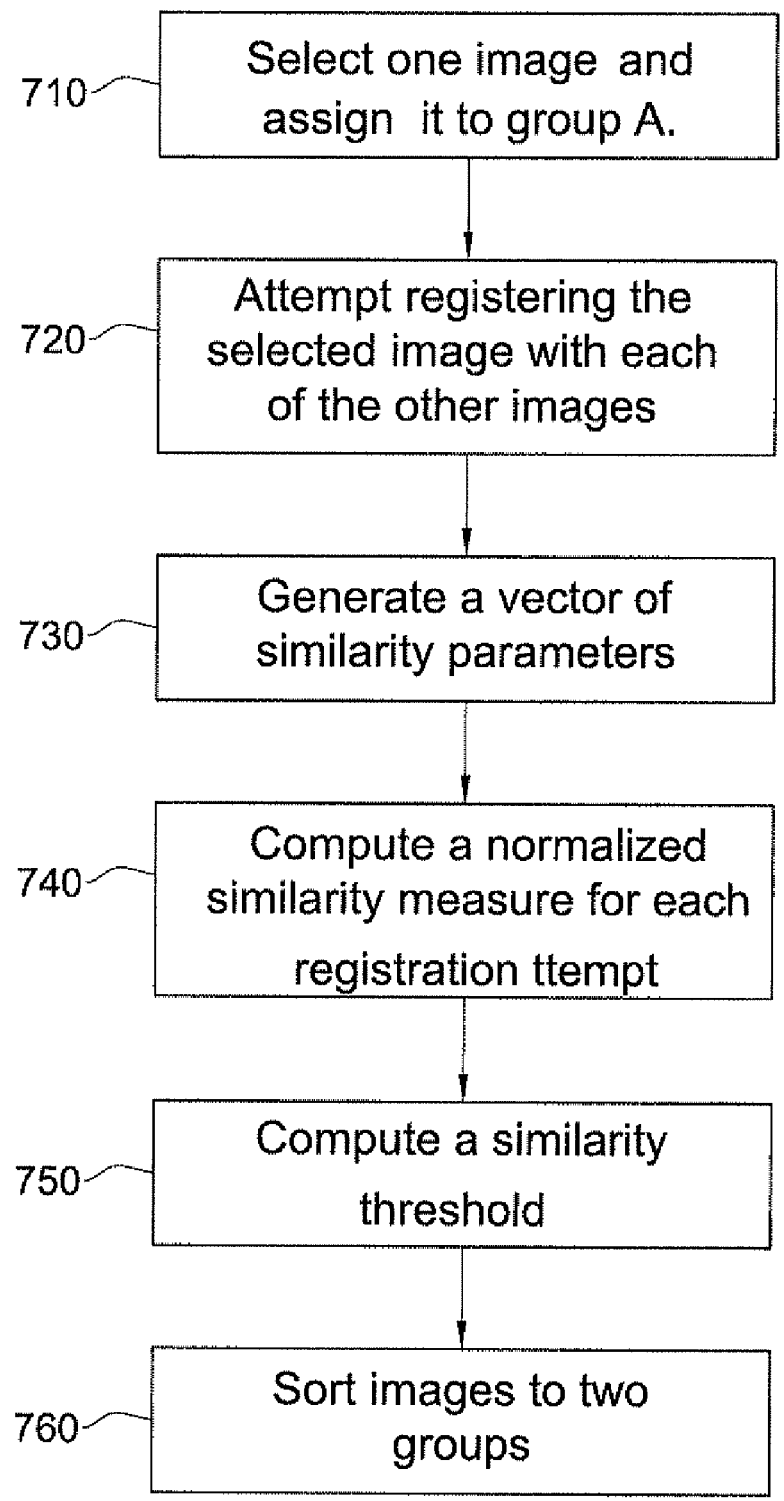
FIG. 7 is a flowchart illustrating the process of sorting images to groups when the angle of acquisition is unknown for at least one of the images.

FIG. 7 is a flowchart illustrating the process of sorting images to groups when the angle of acquisition is unknown for at least one of the images.

A collection of images is given (for example, a batch of images stored in a database), covering roughly the same scene, taken from two unknown but distinct angles of acquisition, each image is marked with its own time tag.

The purpose is to divide the collection of images into two groups (group A and B) where each group includes images taken from similar perspective angles.

Once an image from group A is matched with an image chosen from group B, a stereo pair is formed and a normalized similarity measure Q (0<Q<1) to characterize the degree of their similarity/dissimilarity is produced. (0 means dissimilar and 1 means very similar).

In operation 710, an image is randomly selected from the collection and is assigned to group A. In operation 720, the randomly selected image is than attempted to be registered with each of the remaining images. Note that in a collection of N images, (N−1) registration processes are required. In operation 730, for each registration process, a vector of similarity parameters $(q_{1...t})$ is generated. In operation 740, each vector of similarity parameters $(q_{1...t})$ is used to produce a normalized similarity measure Q for each registration attempt. After all (N−1) images have been registered to the randomly picked first image, the result is N−1 quality measures $(Q_{1...N-1})$ showing how similar/dissimilar these images are relative to the first picked image.

In operation 750, a similarity threshold marked ThQ is computed using the following threshold computation method:

$$ThQ = (MIN(Q_{1...N-1}) + MAX(Q_{1...N-1}))/2;$$

Where $(Q_{1...N-1})$ are the N−1 normalized similarity measures, one for each of the registrations.

The above method for computing a similarity threshold, ThQ is one possible way according to certain embodiments of the present invention. Other methods may also be used, such as using a similarity threshold value defined in advance, based on past statistical data.

The N-1 images that were attempted to be registered against the first randomly selected image are then sorted to either group A or group B in operation 760. For each of those N-1 images, if the normalized similarity measure is above ThQ on a normalized scale between 0 and 1, the image is considered to belong to the same group as the first randomly selected image (group A). If on the other hand the degree of similarity is below the similarity threshold ThQ the image is considered to be taken from a different angle of acquisition and therefore is inserted to group B. Notice that, if the two groups are taken with substantially different perspective angles e.g. in case of very wide base angle, the registration process might even fail to find any tie points and the registration fails, in which case it can confidently be concluded that the two images belong to different groups.

In the above described embodiment it was assumed that the images were taken from only two angles of acquisition. The above method can be expanded to the case with more than two angles of acquisition. In this case, after performing the above described process, group A is left aside and the images which were sorted to group B form the initial batch of images for the next round. In each additional iteration, an additional group is defined, with all its members having a similar acquisition angle as well as a second group which includes the rest of the images. The procedure is employed iteratively until all groups contain images with similar acquisition angles.

Note that the process illustrated by operation 740 in FIG. 7 for measuring the registration quality or success may be also employed in a similar manner for measuring the stereo-matching quality or success (i.e. to a pair of registered stereoscopic images). According to certain embodiments of the present invention, the decision whether the stereo-matching process was successful involves comparing the normalized similarity measure Q of the pair of registered stereoscopic images to a similarity threshold which was pre-defined (e.g. based on laboratory statistical analysis of past successful stereo-matching average normalized similarity measure Q).

Following is a brief description of the registration process, the way the vector of similarity parameters ($q_{1 \ldots t}$) is computed during the registration process and used in order to produce the normalized similarity measure Q.

The image registration process consists of the following main processing modules:
1) Pyramid generation
2) Rough image registration
3) Image warping
4) Fine image registration
5) Final Quality assessment First a pyramidal structure of lower resolution images is created for each one of the original input images. The pyramidal structure is generated by successively low-pass filtering and decimating the original input images.

Rough image registration is the second stage of the registration process and is performed starting at the lowest resolution level of the pyramidal structure e.g. at the top level of the pyramid. At this stage a global transformation between the input images is sought after at the top level of the pyramidal structure. The rough registration is achieved by employing methods well known in the art such as amplitude area correlation, phase area correlation and/or optical flow algorithms. These algorithms are applied over the entire image plane at once and estimate a global affine transformation between the two images. Thus, the output of the rough registration stage is a global affine transformation relating the pixel coordinates in the two input images at the top level of the pyramid. To compute a measure of the quality of the rough registration stage, phase correlation is applied at multiple locations evenly spread over the two roughly matched images. The quality of the rough registration stage is finally computed by the following weighted mean:

$$Q_{rough}=w_1*PerGood+w_2*StdMF+w_3*MeanW$$

The three parameters composing the weighted mean are as follows:
1. PerGood—Percentage of good tie points.
2. StdMF—Normalized standard deviation of the shift norm.
3. MeanW—Normalized mean of the correlation peaks.

PerGood is simply the percentage of retained tie points out of the total number of attempts during the multiple-area correlation.

StdMF is the standard deviation of the shift norm after being normalized into the interval [0 1] by using sigmoid function.

MeanW is the mean of the normalized (into [0 1] interval) correlation peaks.

The weights ($w_1$, $w_2$, $w_3$) are designed to provide different degree of influence on the final quality measure for the different parameters. For example:

$$(w_1,w_2,w_3)=(0.3,0.2,0.5)$$

meaning that the most important and influential parameter is MeanW followed by PerGood and the StdMF.

In order to proceed further on to the higher resolution levels of the pyramid and to assess the quality of the fine registration stage, the global transformation found above is applied on the original input image to resample it onto the reference image and subsequently all its pyramidal levels are also warped accordingly e.g. image warping is applied on the original input image and all its pyramidal structure.

The next stage of the registration process is fine image registration. At this stage the images are already in rough correspondence following the rough registration described above. However, a more accurate matching can be obtained by exploiting the higher resolution levels of the pyramidal structure.

Next stages of the registration process belong to the fine image registration process. The multiple sub-area correlation is applied iteratively though all resolution levels going from coarse resolution levels to fine resolution levels. At each resolution level the registration parameters mentioned above (namely PerGood, StdMF and MeanW) are computed and stored. After the registration process reaches the highest resolution level, the average value of each one of the three parameters is calculated over the different resolution levels and the fine registration quality measure $Q_{fine}$ is finally computed using a weighted mean in a similar manner to the rough quality measure. The normalized similarity measure Q is computed as follows:

$$Q=(w1*Q_{rough}+w2*Q_{fine});$$

The values for the weights (w1, w2), allows one to control the relative importance of the fine registration and the rough registration on the normalized similarity measure Q.

Figure 8:
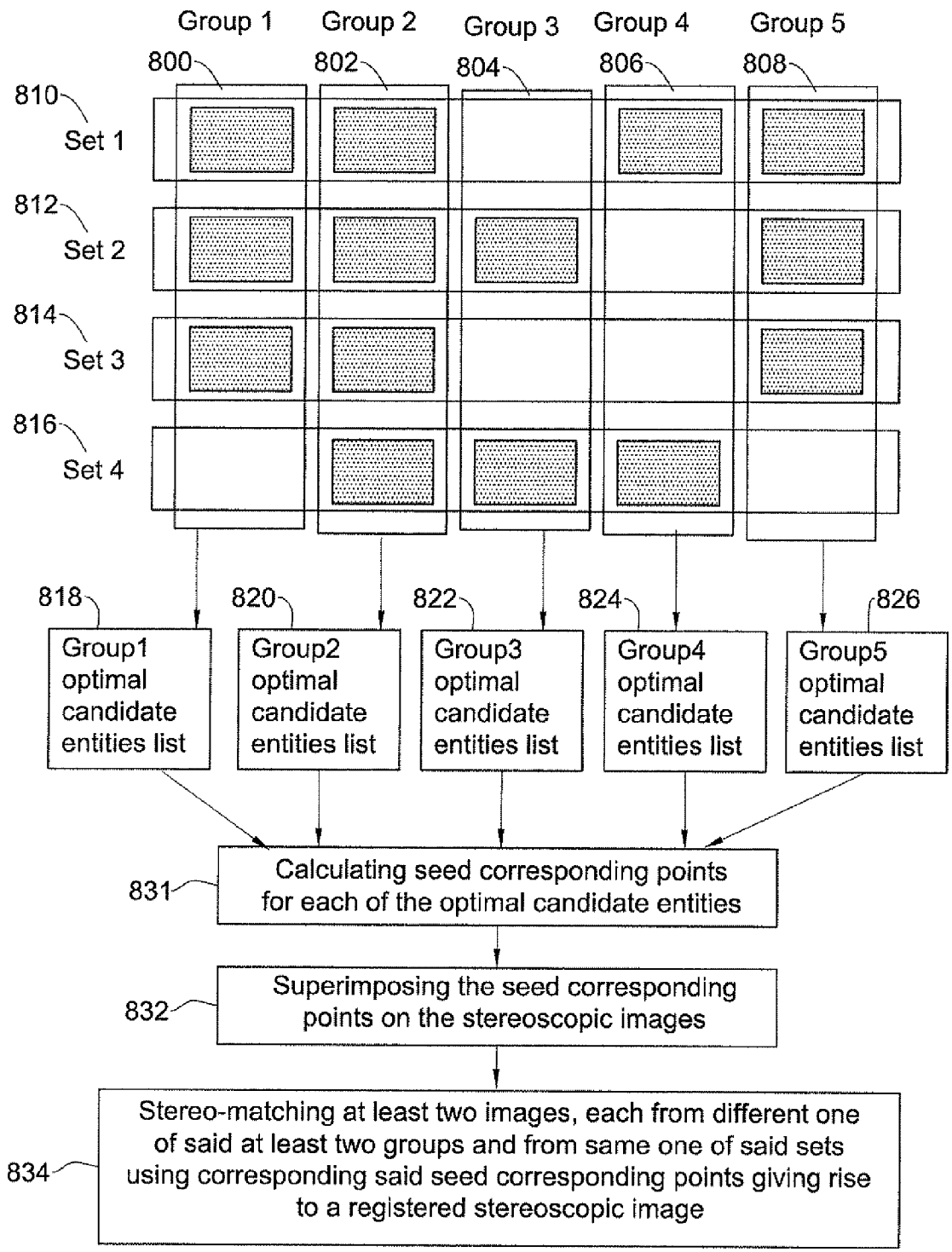
FIG. 8 is a flowchart illustrating a sequence of operations in accordance with certain embodiments of the present invention.

FIG. 8 illustrates another flow diagram for sequence of operations carried out by processor 522 of FIG. 5 in accordance with certain embodiments of the present invention. Multiple sets (four in this particular case) 810-816 which are stored on a non-volatile storage 24 of FIG. 5 are obtained and multiple groups (five in this particular case) 800-808 are selected. Each group contains a different number of images and each group is associated with an optimal entity list 818-826 as previously explained (for simplification reasons only, the stages in the method that lead from the operation of obtaining sets of stereoscopic images to the production of optimal entity list for each group are not shown in detail and are carried out as previously explained). The flow chart, in accordance with certain embodiments of the present invention further comprises additional stages as follows. Seed correspondence points are calculated for each of the optimal entities in operation 831.

In accordance with certain embodiments of the present invention, gravity points were previously calculated for all the candidate entities and therefore are retrieved from the table of FIG. 3 rather than calculated and used as seed correspondence points.

In accordance with certain embodiments of the present invention, alternative methods for calculating seed correspondence points are used.

The seed correspondence points are superimposed on the stereoscopic images in operation 832. In operation 834 at least two images, each from different ones of the groups and from same ones of the sets, are stereo-matched using the corresponding seed correspondence points in order to produce registered stereoscopic images. The method may further proceed to volumetric change detection as previously detailed.

It is to be understood that the invention is not limited in its application to the details and the arrangement of the operations set forth in FIG. 8. In accordance with certain embodiments of the present invention, certain operations of the flow diagram may be omitted or altered, others may be added and the order in which certain operations of the flow diagram are carried out may vary without departing from the scope of the above description and/or the Claims.

Figure 9:
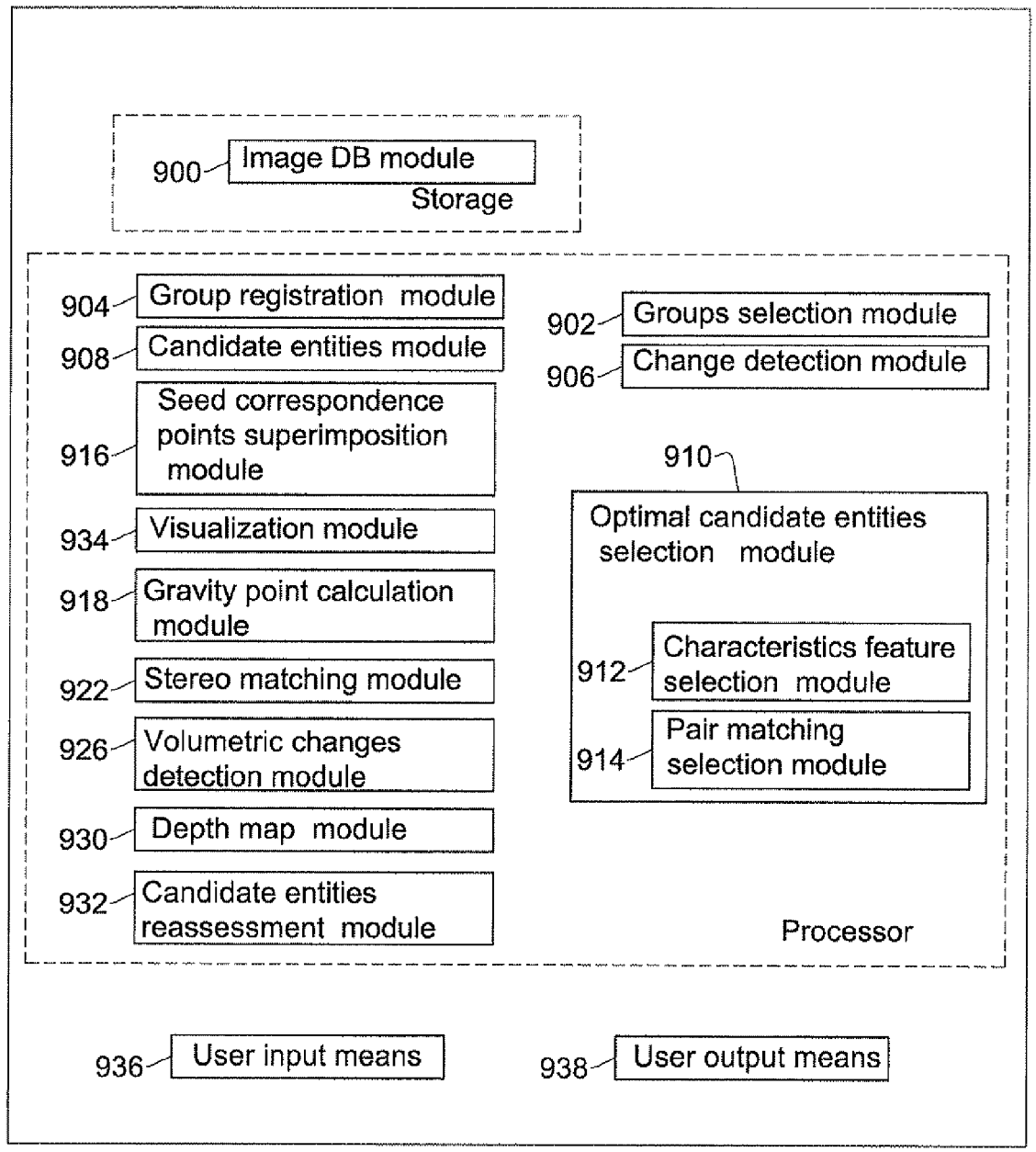
FIG. 9 illustrates system architecture in accordance with certain embodiments of the present invention

FIG. 9 illustrates system architecture in accordance with certain embodiments of the present invention. Modules which are associated with the processor (represented by a broken frame; also represented in FIG. 5 (522)) are presented within the broken frame 950. The Groups selection module 902 obtains at least two sets of stereoscopic images from the Image DB module 900. Each one of the sets includes at least two stereoscopic images that are taken at a given time and from different angles. The image DB module 900 is associated with storage 940, also represented in FIG. 5 (524). The Groups selection module 902 further selects groups of images, so each group includes at least two images, each image from a different set, and all the images in the same groups are taken from similar angles. The group registration module 904 registers at least two of the group's images. The change detection module 906 compares at least two of the registered group's images and produces a binary image of detected differences. Candidate entities module 908 produces the candidate entities list using the binary image. The gravity point calculation module 918 calculates the coordinates of a gravity point for the candidate entities. The optimal entities selection module 910 selects optimal entities from each group's candidate entities list, based on selection criteria. In accordance with certain embodiments of the present invention, the optimal entities selection module 910 comprises one or more specific criteria selection modules such as a characteristics feature selection module 912 (which selects optimal entities based on some characteristics features such as minor axis to major axis ratio or surface area) and pair matching selection module 914 (which selects those candidate entities that match a corresponding candidate entity from the other candidate entities list to form a pair). The optimal entities' superimposition module 916 superimposes the calculated seed correspondence points back on the stereoscopic images which are intended to be stereo matched. The stereo matching module 922 obtains the stereo images, with the corresponding seed correspondence points super-imposed, initiates the stereo-matching process using the gravity points as tie-points, and carries the comprehensive registration of the stereo images. In accordance with certain embodiments of the present invention, the system further includes the following modules: A depth map module 930, in which a depth map is produced for each one of the registered stereoscopic image pairs, reflecting relative height of the scenery. In accordance with certain embodiments, the depth maps include at least the coordinates corresponding to the candidate entities coordinates. Candidate entities reassessment module 932, in which candidate entities from the candidate entities lists are reassessed against two or more depth maps, to find the relative height of each candidate entity as it appears in the depth maps and the relative height of each of those candidate entities is compared between the two depth maps. Volumetric changes detection module 926 classifies each of the reassessed candidate entities as a volumetric difference based on data received from the candidate entities reassessment module 932.

In accordance with certain embodiments of the present invention, visualization module 934 creates a visualization representation of the candidate entities (or a partial group of candidate entities, optimal entities or volumetric changes only), based on the user preferred way of visualization. Also included are the user output means 938 (corresponding to user output device 534 in FIG. 5), such as a monitor or printer, used for example for presenting the visualization data to the user and the user input means 836 (corresponding to user output device 530 in FIG. 5) such as a keyboard and/or a user pointing device such as a mouse, used for example for communicating user commands to the system.

It is to be understood that the invention is not limited in its application to the details and the arrangement of the components set forth in FIG. 9. In accordance with certain embodiments of the present invention certain modules may be omitted, altered and others may be added without departing from the scope of the above description and/or the following Claims.

An advantage of certain embodiments of the present invention is that the method of the present invention for the registration of stereoscopic images taken from significantly different angles of perspective does not depend on any additional image acquisition data beyond time of acquisition, angle of acquisition and geographical region that was imaged. It does not depend on any exterior clues e.g. regarding the position and tilt angle of the camera at the time of image acquisition. Such exterior clues are produced e.g. by GPS and IMU systems and are a preliminary requirement in other methods known in the art. The present invention therefore allows, in accordance with certain embodiments, for the use of much simpler and economical systems to achieve the registration.

In accordance with certain embodiments, the present invention applies in a non-limiting manner to both still imagery as well as video-based remote sensing.

In accordance with certain embodiments, the present invention applies in a non-limiting manner to any known stereoscopic image acquisition technique such as a tilting (gimbals) camera continuously swapping between the two angles, a fixed camera used in a two passes manner, two cameras fixed at different pointing angles, etc.

It will be understood that according to the invention the system may be a suitable programmed computer. Likewise, the invention contemplates a computer program being readable by a computer for executing the method of the invention. The invention further contemplates a machine-readable memory tangibly embodying a program of instructions executable by the relevant apparatus for performing and executing the method and the subject matter of the invention.

Unless specifically stated otherwise, as apparent from the following discussions, it is appreciated that throughout the specification discussions, utilizing terms such as, "processing", "computing", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may use terms such as, processor, computer, storage, database, apparatus, system, sub-system, module, unit and device (in single or plural form) for performing the operations herein. This may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

With specific reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more details than is necessary for a fundamental understanding of the invention. The description taken with the drawings makes apparent to those skilled in the art how the several forms of the invention may be embodied in practice.

Features of the present invention which are described in the context of separate embodiments may also be provided in combination in a single embodiment. Conversely, features of the invention which are described for brevity in the context of a single embodiment may be provided separately or in any suitable sub-combination The present invention has been described, with a certain degree of particularity, but those versed in the art will readily appreciate that various variations, alterations and modifications may be carried out, without departing from the scope of the above description and/or the following Claims.

The invention claimed is:

1. A method for producing tie points for use in stereo-matching of stereoscopic images, the method comprising:
   a) obtaining at least two sets of stereoscopic images, each one of said at least two sets including images that are taken from different angles, each one of said at least two sets including images taken at different time with respect to the images of the other sets;
   b) determining at least two groups of images, each one of said groups including at least two images of at least two of said sets or are derived from images of said sets; and
   c) for each one of said groups, calculating a respective optimal entities list including:
      i) registering at least two images of said group giving rise to registered images;
      ii) detecting changes between the registered images thereby giving rise to a candidate entities list; and
      iii) selecting at least four optimal entities from said candidate entities list in accordance with at least one selection criterion, thereby giving rise to said optimal entities list;
   whereby entities of the optimal entity lists are used as tie points for stereo-matching at least two images, each one being or derived from different one of said at least two groups thereby giving rise to at least one pair of stereo-matched stereoscopic images.

2. The method according to claim 1 wherein said determining at least two groups of images further comprises:
   a) associating at least two images from said at least two sets with a first collection of images;
   b) iteratively, until a condition is met:
      i. selecting one image from said first collection and transferring it to a new group giving rise to a reference image;
      ii. conducting a series of registration attempts, for each one of said registration attempts attempting to register the reference image with each image from said first collection;
      iii. computing a normalized similarity measure for each one of the registration attempts;
      iv. computing a similarity threshold; and
      v. transferring each image from said first collection having said normalized similarity measure above said similarity threshold to the new group.

3. The method according to claim 2 wherein the condition is met when there are no images associated with the first collection.

4. The method, according to claim 1 wherein said stereo-matching comprises:
   a) computing a normalized similarity measure for each one of said pairs of stereo-matched stereoscopic images;
   b) providing a similarity threshold;

wherein successful stereo-match of each of the pairs of registered stereoscopic images is confirmed if the corresponding normalized similarity measure exceeds the corresponding similarity threshold.

5. The method according to claim 1, wherein each one of said at least two sets including at least two images that are taken during the same flight leg.

6. The method according to claim 1, wherein the images of each of said groups are taken from acquisition angles within a range of 10 degrees or less.

7. The method according to claim 1, further comprising:
calculating a respective seed correspondence point for each entity of the optimal entities lists;
whereby the seed correspondence points are used as tie points for stereo-matching at least two images, each one being or derived from different one of said at least two groups thereby giving rise to at least one pair of stereo-matched stereoscopic images.

8. The method according to claim 1 wherein the pair of stereo-matched stereoscopic images is produced from stereoscopic images that are being or derived from images taken from two angles, at least 10 degrees apart.

9. The method according to claim 1 wherein the pair of stereo-matched stereoscopic images is produced from stereoscopic images that are being or derived from images taken from two angles, at least 25 degrees apart.

10. The method according to claim 1 wherein the pair of stereo-matched stereoscopic images is produced from stereoscopic images that are being or derived from images taken from two angles, at least 35 degrees apart.

11. The method according to claim 1 wherein the pair of stereo-matched stereoscopic images is produced from stereoscopic images that are being or derived from images taken from two angles, at least 45 degrees apart.

12. The method according to claim 1, wherein the images of each of said groups are taken from substantially the same angle.

13. A method for detecting differences in a photographed scenery between two time points, the method comprising:
  a) obtaining at least two sets of stereoscopic images, each one of said at least two sets including images that are taken from different angles, each one of said at least two sets including images taken at different time with respect to the images of the other sets;
  b) determining at least two groups of images, each one of said groups including at least two images of at least two of said sets or are derived from images of said sets; and
  c) for each one of said groups, calculating a respective optimal entities list including:
    i) registering at least two images of said group giving rise to registered images;
    ii) detecting changes between the registered images thereby giving rise to a candidate entities list; and
    iii) selecting at least four optimal entities from said candidate entities list in accordance with at least one selection criterion, thereby giving rise to said optimal entities list;
  d) stereo-matching at least two images, each one being or derived from different one of said at least two groups and same or different sets, using at least four optimal entities from each one of said optimal entities list giving rise to at least one pair of registered stereoscopic images;
  e) producing depth maps for at least two of said pairs of registered stereoscopic images; and
  f) calculating height differences between corresponding regions of said depth maps;
whereby volumetric differences are detected between said sets of stereoscopic images.

14. The method according to claim 13, wherein the images of each of said group are taken from acquisition angles within a range of 10 degrees or less.

15. The method according to claim 13, wherein:
said depth maps are produced only for regions derived from coordinates of entities of the candidate entities lists and
entities from the candidate entities lists are reassessed against at least two of said depth maps
wherein said entities of the candidate entities lists are classified as volumetric differences if the reassessment shows height difference.

16. A system for producing tie points for use in stereo-matching of stereoscopic images, the system comprising:
a processor and associated storage, said processor and associated storage are configured to perform at least the following:
  a) obtain at least two sets of stereoscopic images, each one of said at least two sets including images that are taken from different angles, each one of said at least two sets including images taken at different time with respect to the images of the other sets;
  b) determine at least two groups of images, each group including at least two images of at least two of said sets or are derived from images of said sets; and
  c) for each one of said groups, calculate a respective optimal entities list including:
    i) registering at least two images of said group giving rise to registered images;
    ii) detecting changes between the registered images thereby giving rise to a candidate entities list; and
    iii) selecting at least four optimal entities from said candidate entities list in accordance with at least one selection criterion, thereby giving rise to said optimal entities list;
whereby entities of the optimal entity lists are used as tie points for stereo-matching at least two images, each one being or derived from different one of said at least two groups thereby giving rise to at least one pair of stereo-matched stereoscopic images.

17. The system according to claim 16, wherein the images of each of said group includes at least two images that are taken from acquisition angles within a range of 10 degrees or less.

18. A program storage device readable by machine, tangibly embodying a program of instructions executable by the machine to perform method operations for producing tie points for use in registering stereo-matching of stereoscopic images, said method comprising:
  a) obtaining at least two sets of stereoscopic images, each one of said at least two sets including images that are taken from different angles, each one of said at least two sets including images taken at different time with respect to the images of the other sets;
  b) determining at least two groups of images, each one of said groups including at least two images of at least two of said sets or are derived from images of said sets; and
  c) for each one of said groups, calculating a respective optimal entities list including:
    i) registering at least two images of said group giving rise to registered images;
    ii) detecting changes between the registered images thereby giving rise to a candidate entities list; and iii) selecting at least four optimal entities from said candidate entities list in accordance with at least one selection criterion, thereby giving rise to said optimal entities list;

whereby entities of the optimal entity lists are used as tie points for stereo-matching at least two images, each one being or derived from different one of said at least two groups thereby giving rise to at least one pair of stereo-matched stereoscopic images.

19. The program storage device according to claim 18, wherein the images of each of said groups are taken from acquisition angles within a range of 10 degrees or less.

20. A method for producing tie points for use in stereo-matching of stereoscopic images, the method comprising:
1) registering at least two pairs of images that include a common target, the images in each pair taken from substantially same angle unique for each pair, and each pair including images taken at different time points;
2) for each one of the registered pairs, calculating an optimal entities list by:
   i) detecting changes between images of the registered pair thereby giving rise to a candidate entities list; and
   ii) selecting at least four optimal entities from said candidate entities list in accordance with at least one selection criterion, thereby giving rise to said optimal entities list;

whereby the optimal entities lists are used as tie points for stereo-matching at least two images, each one being or derived from different one of the registered pairs.

* * * * *